US010035579B2

(12) United States Patent
Iglesias

(10) Patent No.: US 10,035,579 B2
(45) Date of Patent: Jul. 31, 2018

(54) DEVICE FOR SIMULTANEOUSLY AND PROGRESSIVELY VARYING THE CAMBER AND THE ANGLE OF ATTACK OF HYDRODYNAMIC AND AERODYNAMIC WINGS

(71) Applicant: Jean Francois Iglesias, Naves Pârmelan (FR)

(72) Inventor: Jean Francois Iglesias, Naves Pârmelan (FR)

(*) Notice: Subject to any disclaimer, the term of this patent is extended or adjusted under 35 U.S.C. 154(b) by 341 days.

(21) Appl. No.: 14/859,193

(22) Filed: Sep. 18, 2015

(65) Prior Publication Data

US 2016/0090169 A1    Mar. 31, 2016

(30) Foreign Application Priority Data

Sep. 30, 2014 (FR) .................................. 14 02226

(51) Int. Cl.
| *B64C 3/44* | (2006.01) |
| *B64C 3/48* | (2006.01) |
| *B63B 1/28* | (2006.01) |
| *B63H 25/38* | (2006.01) |
| *B63B 39/06* | (2006.01) |

(Continued)

(52) U.S. Cl.
CPC ............... *B64C 3/48* (2013.01); *B63B 1/285* (2013.01); *B63B 39/06* (2013.01); *B63B 41/00* (2013.01); *B63H 1/36* (2013.01); *B63H 25/382* (2013.01); *B64C 3/385* (2013.01); *B64C 3/44* (2013.01);

(Continued)

(58) Field of Classification Search
CPC .. B64C 3/48; B64C 3/44; B64C 3/385; B64C 2003/445; B63H 1/36; B63H 25/382; B63B 41/00; B63B 39/06; B63B 1/285; B63B 2039/063
See application file for complete search history.

(56) References Cited

U.S. PATENT DOCUMENTS 3,734,432 A * 5/1973 Low .................... B64C 13/16
244/174
3,986,688 A * 10/1976 Giragosian ............. B64C 3/48
244/113
(Continued)

FOREIGN PATENT DOCUMENTS

DE    3246126 A1    6/1984
DE    3619962 A1    12/1987
(Continued)

*Primary Examiner* — Assres H Woldemaryam
(74) *Attorney, Agent, or Firm* — Cionca IP Law P.C.; Marin Cionca

(57) ABSTRACT

A device for simultaneously and progressively varying the camber and the angle of attack of a hydrodynamic and aerodynamic profile of a wing, the latter being able to adopt multiple positions including a position at rest, the said profile at rest being in a plane, the device having a wing with a profile having a leading edge at the front and a trailing edge at the rear, a seat arranged in the upper part of the profile of the wing connected at one of its ends to the front upper part of the profile by a first pivot, and at its other end to a lever by a connection point, a lever connected to the rear upper part of the profile by a second pivot, and that at rest, a seat and at least one lever are aligned or substantially aligned along the same axis and are included in the same plane as the profile.

45 Claims, 8 Drawing Sheets

(51) Int. Cl.
*B63B 41/00* (2006.01)
*B63H 1/36* (2006.01)
*B64C 3/38* (2006.01)

(52) U.S. Cl.
CPC ... *B63B 2039/063* (2013.01); *B64C 2003/445* (2013.01)

(56) References Cited

U.S. PATENT DOCUMENTS

| | | | | |
|---|---|---|---|---|
| 4,296,900 A * | 10/1981 | Krall | ............... | B64C 3/48 |
| | | | | 244/207 |
| 4,582,278 A * | 4/1986 | Ferguson | ............... | B64C 3/46 |
| | | | | 244/219 |
| 4,725,026 A * | 2/1988 | Krafka | ............... | B64C 9/16 |
| | | | | 244/213 |
| 5,273,472 A | 12/1993 | Skedeleski et al. | | |
| 5,531,407 A * | 7/1996 | Austin | ............... | B64C 3/48 |
| | | | | 244/219 |
| 6,045,096 A * | 4/2000 | Rinn | ............... | B64C 3/48 |
| | | | | 244/219 |
| 6,276,641 B1 * | 8/2001 | Gruenewald | ............... | B64C 3/48 |
| | | | | 244/213 |
| 8,783,604 B2 * | 7/2014 | Sanderson | ............... | B64C 3/56 |
| | | | | 244/123.1 |
| 2009/0224108 A1 * | 9/2009 | Lutke | ............... | B64C 3/46 |
| | | | | 244/219 |
| 2010/0133387 A1 * | 6/2010 | Wood | ............... | B64C 3/48 |
| | | | | 244/219 |
| 2013/0126666 A1 * | 5/2013 | Brown | ............... | B60F 5/02 |
| | | | | 244/2 |
| 2014/0097621 A1 * | 4/2014 | Kassianoff | ............... | B63H 1/36 |
| | | | | 290/55 |

FOREIGN PATENT DOCUMENTS

| | | |
|---|---|---|
| DE | 3619998 A1 | 12/1987 |
| DE | 19613673 A1 | 10/1997 |
| EP | 0245571 A1 | 11/1987 |
| FR | 2467775 A1 | 4/1981 |
| FR | 2643328 A1 | 8/1990 |
| FR | 2654063 A1 | 5/1991 |
| FR | 2812270 A1 | 2/2002 |
| FR | 2903377 A1 | 1/2008 |
| WO | WO 2014118749 A1 | 8/2014 |

\* cited by examiner

DEVICE FOR SIMULTANEOUSLY AND PROGRESSIVELY VARYING THE CAMBER AND THE ANGLE OF ATTACK OF HYDRODYNAMIC AND AERODYNAMIC WINGS

CROSS-REFERENCE TO RELATED APPLICATIONS

This application claims priority to French Application No. 14/02226 filed Sep. 30, 2014, which is hereby incorporated by reference.

BACKGROUND OF THE INVENTION

The present invention relates to improvements to wings fitted to waterborne or airborne vehicles by enabling automatic and linked progressive variation of the camber and the angle of attack of the wing, depending on the direction and relative velocity of the fluid.

To limit or instigate the lateral displacement of a vehicle an effective force called hydrodynamic or aerodynamic lift is usually produced by a wing or hydrofoil. The useful lift force produced by this wing is accompanied by an undesirable force, called drag, which opposes the progress of the vehicle. The wing's profile is crossed by a line named the chord, connecting the leading edge to the trailing edge. The profile is said to be cambered, following a curved line, if it is asymmetric about the chord. The angle of attack of the wing is the angle between the chord and the direction of the fluid. It is well known that the lift and drag forces increase as the angle of attack is increased. It is also well known that for profiles of identical thickness and angle of attack, a cambered profile creates more lift and drag than a profile with a camber of zero and that is symmetrical about its chord.

This efficiency gain provided by the camber is explained by the speed difference and distance traveled by the fluid between the lower and upper surfaces of the profile which, according to Bernoulli's well-known equation, generates a pressure difference between the lower and upper surfaces of the profile It is also well known from the physical law of the change of momentum, that the change in direction of the fluid created by the profile generates a beneficial reaction force when the trailing edge is aligned with the direction of the force that it is desired to produce. (References to aerodynamics: "The element of wing and airscrew theory" by H. Glauert, "Subsonic aerodynamics (aérodynamique subsonique)" by Ion Paraschivoiu, École Polytechnique de Montréal, 1998).

As a result, for minimum drag, it is best to have a symmetrical profile with zero camber and a zero angle of attack and, to obtain lift, apply an angle of attack or a camber to the profile, or both together.

When a boat is not subjected to lateral forces and is moving in the right direction, the centreboard should not generate any lift and should produce the minimum of drag. In these conditions, where the required lift force is zero, the optimum profile will have a zero angle of attack and no camber. But when a lateral force applied to the vessel drags the boat sideways in one direction, the profile's angle of attack and camber must be modified to generate a lift force designed to limit the sideslip as far as possible.

The result of these variations in the lift requirements is that, to obtain optimum performance under varying conditions of lateral movement the camber must be varied in conjunction with varying the angle of attack, to change from a camber of zero (yielding a symmetric profile when the angle of attack is zero) to a maximum camber when the angle of attack is a maximum. Traditional centreboard or rudder profiles have the disadvantage of not varying their camber with the angle of attack, resulting in sub-optimal performance.

Another parameter limiting the performance of profiles with traditional designs is that the optimum angle of attack and the orientation of the leading edge is difficult for the manufacturer to assess, as they have to precisely locate the centreboard in a watercraft operating in conditions of continuously varying fluid speeds and directions. This results in performance losses arising from excessive or insufficient angles of attack and badly aligned leading and trailing edges, when the direction and speed of the vehicle varies. This is a disadvantage for traditional anti-drift devices.

Devices for adjusting the shapes and angles of attack of sails are well-known, but these devices require human intervention for their adjustment.

Flexible wings with adjustable or invertible cambers are well known but these devices do not allow progressive and simultaneous variation of the camber and the angle of attack depending on the lateral force.

It is well known from patents FR 2 654 063, FR 2 643 328 and FR 267 775 which disclose ailerons with adjustable flaps modifying the profile's camber, or devices for varying the shape of profiles disclosed in WO 2014/118749 but these devices do not change their camber in conjunction with their angle of attack, and the direction of the leading edge is not automatically adjusted to correspond with the lateral force. This results in manual interventions and adjustments that are difficult to envisage in conditions in which there are frequent variations in direction.

Devices incorporating wings with angles of attack that vary as a function of the transverse force are well known, but are devoid of any variation of camber, such as the devices disclosed by patent FR 2 903 377 relative to flippers, but without the camber being linked to the angle of attack the wing's trailing edge does not allow optimum redirection of the fluid leas it leaves the wing and this limits performance.

Also well known, disclosed in patent DE 36 19 998, is a device consisting of a deformable wing elastically connected to two parallel shafts. These are connected by two rigid arms. The two shafts and the arms form a non-deformable quadrilateral.

Patent DE 36 19 962 also discloses a device consisting of a deformable wing elastically connected to two shafts. One of the shafts is connected at each of its ends to the two rigid arms, while the other shaft is connected to a bracket consisting of two fixing lugs. These two fixing lugs are further connected to an additional shaft, the latter being connected to the two rigid arms described previously.

BRIEF SUMMARY OF THE INVENTION

Thus, the invention relates to a device for simultaneously and progressively varying the camber and the angle of attack of the hydrodynamic or aerodynamic profile of a wing. This latter can take many positions including a rest position, while the profile at rest lies in a plane. A device in accordance with the invention comprises a wing profile with a leading edge at the front and a trailing edge at the rear, a seat arranged in the upper part of the wing profile, connected at one of its ends to the front upper portion of the profile by a first pivot, and at its other end to a lever by a connection point, a lever connected to the rear upper part of the profile by a second pivot, while at rest, a seat and at least one lever are aligned or substantially aligned along the same axis and lie in the same plane as the profile.

In addition, the profile comprises at least one joint that can pivot.

Note that at least one joint is composed of several hinges.

According to one embodiment, at least one joint is made of a flexible material filling grooves that are cut into the wing made of a more rigid material.

According to another embodiment, the lever forms part of the wing, in which the flexible material carries the second pivot.

According to one embodiment, the lever forms part of the seat, of which the flexible material makes a connection point.

According to another embodiment, at least one pivot comprises a flexible spring portion, providing resistance to movement of this/these latter.

According to another embodiment, at least one joint comprises a flexible spring portion, providing resistance to movement of this/these latter.

According to one embodiment, the profile of the wing has at least one reinforcement.

According to the preceding embodiment, at least one reinforcement constitutes a hinge with at least one joint.

According to the preceding embodiment(s), a lever and at least one reinforcement is a single piece.

Note that the profile preferably comprises a first part whose front portion is formed by the leading edge and a final part whose rear portion is formed by the trailing edge, and at least one intermediate part.

Note that the device according to the invention comprises a closed kinematic loop made up of the wing profile, the first pivot, at least one seat, at least one connection point, at least one lever and the second pivot.

According to one embodiment, a hull of a waterborne or airborne vehicle comprises one or more grooves in which the seat of a winged device is/are fitted in accordance with the invention.

According to another embodiment, a propulsion or lift device pivoting with respect to a hull of a waterborne or airborne vehicle, comprising a shaft operated by a user or by an engine rotating a hub equipped with one or more wing device(s) according to the invention.

Other features and advantages of the invention will become apparent from the following description with reference to the accompanying drawings which are given by way of non-limiting examples.

DETAILED DESCRIPTION

Figure 1:
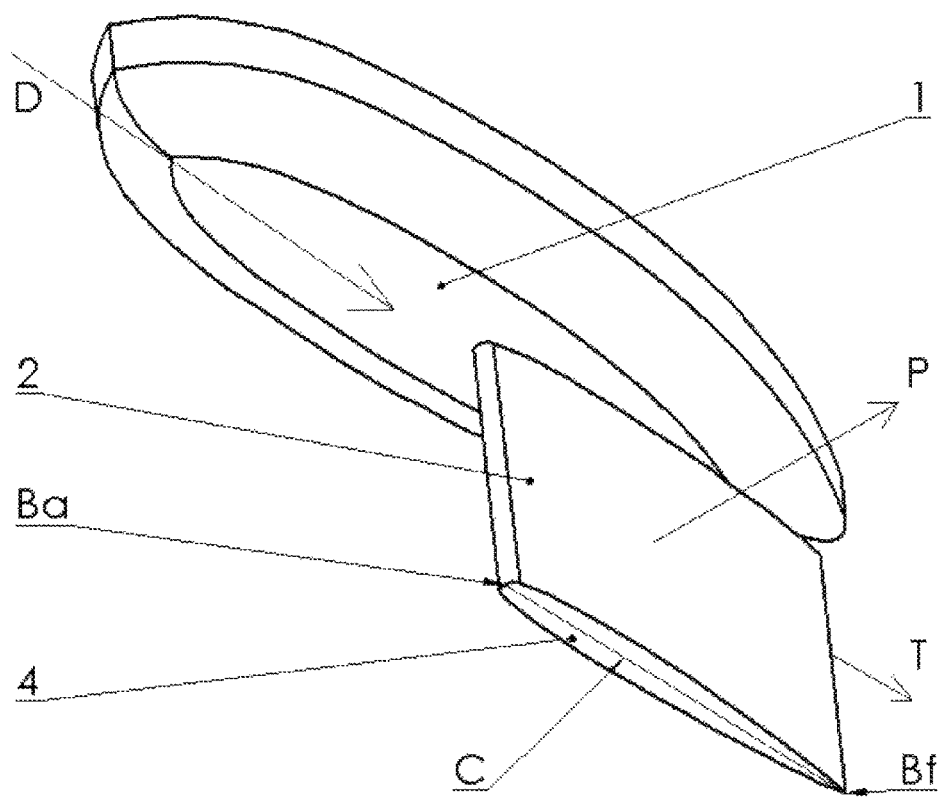
FIG. 1 shows schematically in perspective a centreboard of a boat with a symmetrical profile having zero camber.
Figure 2:
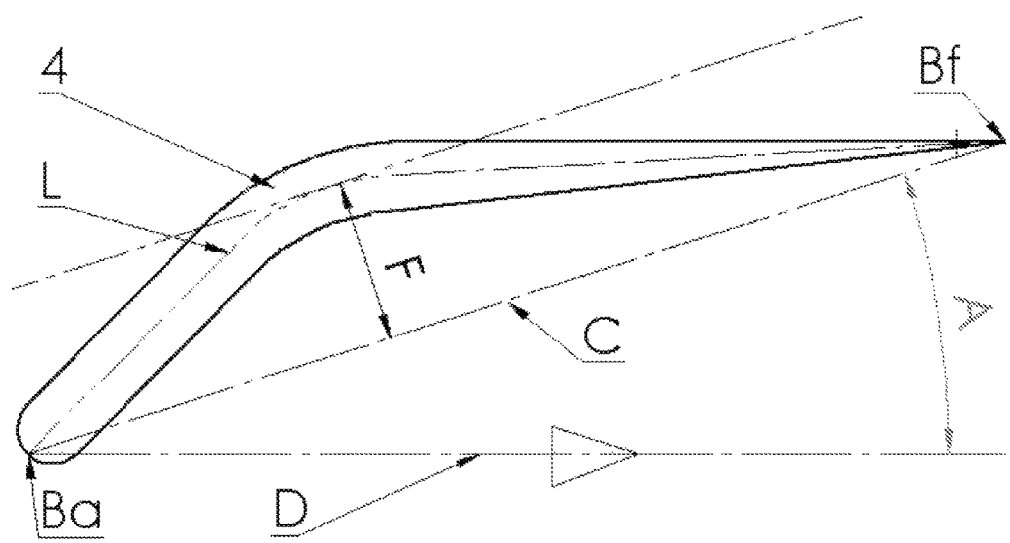
FIG. 2 shows the profile of a cambered centreboard and illustrates the definition of camber, the leading and trailing edges, the chord, and the angle of attack or incidence.
Figure 3:
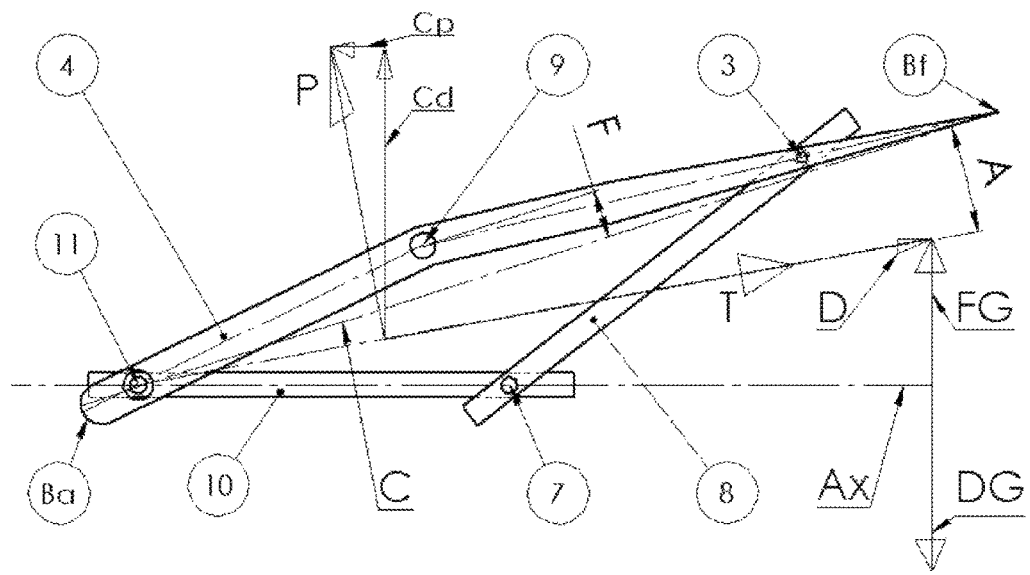
FIG. 3 shows the device with its camber generated by a simple joint implementing this pivot. This figure is a reference showing the forces acting on the device.

The device according to the invention, as illustrated in FIG. 3, overcomes the drawbacks described by automatically making, without human intervention, a gradual variation in the camber of the profile (4), as a function of the angle of attack (A), modified by the transverse force (FG), resulting from the sideslip (DG) acting on the device. This automatic linked variation in the camber and the angle of attack of the wing produces a lift force (P) which has a beneficial thrust component (Cp) in the direction of travel of the vehicle and a beneficial component (Cd) opposing the sideslip (DG).

According to one embodiment, the device according to the invention comprises a profiled wing (2), linked to a seat (10) through a pivot (11) enabling the orientation of the leading edge (Ba) of the profile (4) relative to the seat (10) to be varied. The profile (4) can modify its camber (F) and the position of its trailing edge (Bf) by at least one joint (9) positioned by a link (3) connecting the rear part of the profile (4) by a lever (8) with the seat (10) and a connection point (7). The pivoting mechanical connections (11, 9, 3 and 7), linking the wing (4), the seat (10) and the lever (8) of the device form a closed kinematic loop defining both the positioning and the progressive and simultaneous deformation of each element of the device. The number of elements of this kinematic loop may vary according to particular embodiments.

Thus, the simultaneous, gradual variation of the profile's (4) camber and angle of attack on a hydrodynamic or aerodynamic wing (2), according to the invention, as illustrated in FIGS. 3 to 15, appears in the form of a wing (2) comprising a profile (4) formed by a leading edge (Ba) at the front and a trailing edge (Bf) at the rear. The upper portion of the leading edge (Ba) is connected to a first pivot (11), while the upper portion of the trailing edge (Bf) is connected to a second pivot (3).

Note that the upper front part of the profiled wing (2) is connected to a seat (10) by the first pivot (11), while the upper rear part is connected to a lever (8) by the second pivot (3).

It is understood that the upper part or the upper position corresponds to that part of the wing (2) that is arranged to connect to a seat (10) which is connected to a support.

It is also understood that a seat (10) is either a full part of the device according to the invention, or is an integral supporting part in any aerodynamic or hydrodynamic medium, such as a hull, a propeller in the broadest sense of the term, namely a rotating wing, or a flipper. In other words, the seat (10) can be any such support as described above.

According to one embodiment, the seat (10) is connected to the lever (8) by a connection point (7) forming a further pivot.

According to the above embodiment, in the rest position, the seat (10) and the lever (8) are aligned, or substantially aligned, along the same axis, included in the mean plane formed by the profile (4) of the wing (2) at rest. The axis formed by the upper profile (4) of the wing (2) is advantageously parallel to that of the seat (10), but it could also be formed by the axes of the upper part of the profile (4) and the seat (10) at the point where they converge at the front end of the profile (4).

According to one embodiment, the device of the invention comprises a single lever (8).

According to the embodiments, the device comprises a series of levers (8) each connected via connection points (7), preferably two levers (8), namely a first lever (8) connected at one of its ends to the seat (10) by a first connection point (7), while its other end is connected to a second lever (8) by a second connection point (7). The rear end of the second lever (8) is connected to the rear upper end of the profiled wing (2) by the second pivot (3).

It is understood that in the rest position, a series of levers (8) are aligned or substantially aligned along the same axis, included in the plane formed by the profile of the wing (2) at rest.

The term substantially aligned means that both axes form an angle of between 0 degrees and 20 degrees, preferably between 0 degrees and 10 degrees, more preferably between 0 degrees and 5 degrees.

According to one embodiment, the device of the invention comprises a single seat (10) connected to a support, arranged in the upper part of the profile (4) of the wing (2).

According to other embodiments, two assemblies formed by a single seat (10) connected to at least one lever (8) are arranged opposite each other on either side of a wing (2). The lower and upper front parts of the wing (2) are each connected to a seat (10) by a pivot (11), while the lower and upper rear parts of the wing (2) are each connected to a lever (8) by a pivot (3). A seat (10) and at least one lever (8) of each assembly are aligned or substantially aligned. It is understood that only the seat (10) in the upper part is connected to a support.

According to one embodiment, the profile (4) of the wing (2) comprises a series of joints (9) that can pivot.

According to the previous embodiment, the profile (4) consists of a series of parts (4a, 4b, 4c) connected to each other by joints (9) forming grooves (15) that pass all the way through, or not. Alternatively the profile (4) consists of a flexible wall whose elasticity is suitable for use.

It is understood that the series of parts (4a, 4b, 4c) forming the profile (4) is preferably coated with a synthetic material.

More accurately, the profile (4) preferably comprises a first part (4a) whose front portion is formed by the leading edge (Ba) and a final part (4c) whose rear portion is formed by the trailing edge (Bf), and at least one intermediate part (4b), preferably a series of intermediate parts (4b).

According to one embodiment, the shafts carried by the grooves (15) forming the joints (9) are parallel.

According to another embodiment, the shafts carried by the grooves (15) forming the joints (9) converge to a vanishing point located outside the upper profile (4). Alternatively the vanishing point is located outside the lower part of the profile (4), or arranged on the upper part or part of the profile (4).

According to one embodiment, the bottom part of the profile (4) is curved, and it therefore forms the leading edge (Bf).

According to the above embodiment, the lower portions of the intermediate parts (4b) and the final part (4c) are also formed by the leading edge (Bf).

According to another embodiment, the profile (4) of the wing (2) comprises a least one reinforcing piece, preferably metallic, for example a strip, preferably at least two reinforcing pieces.

According to the above embodiment, at least two reinforcing pieces constitute a single part.

According to the above embodiment, at least one lever (8) and at least two reinforcing pieces constitute a single part.

According to one embodiment, a reinforcing piece extends from the leading edge (Ba) to the trailing edge (Bf).

According to another embodiment, a reinforcing piece extends from one part (4a, 4b, 4c) to another part (4a, 4b, 4c) that makes up the profile (4).

Part of a reinforcing piece or a reinforcing piece arranged between two component parts of the profile (4) form a joint (9).

Thus, the device comprises a closed kinematic loop formed by the profile (4) of the wing (2) preferably consisting of a series of parts (4a, 4b, 4c) connected by joints (9), the first pivot (11), at least one seat (10), at least one connection point (7), at least one lever (8) and the second pivot (3).

The relative position of each element being determined by the dimensions and flexibility of the components, it is possible to determine at design time the deflection and positioning of all the elements, depending on the variation in the lateral force (FG) applied to the device. The variation of the camber (F) of the profile (4) and the position of the trailing edge (Bf) are thus produced by varying the angle of the joint (9) which can be divided, according to particular embodiments, into several joints, or simply formed by a flexible part.

The change in camber and orientation of the leading edge (Ba) is thus generated by rotation of the wing about the pivot (11) which changes the angle of attack (A) of the profile with respect to its seat (10). The rotation about the pivot (11), determining the angle of attack (A), is produced by the lateral force (FG) generated by the direction (D) and the speed of the fluid in contact with the surfaces of the profile when the direction of the fluid has a non-zero transverse component (FG), the profile changes its camber together with its angle of attack and generates a beneficial lift force, and/or when the direction of the fluid is parallel to the seat, its transverse component is zero, the profile is then feathered, with a zero angle of attack, zero camber, zero lift and minimum drag.

Figure 4:
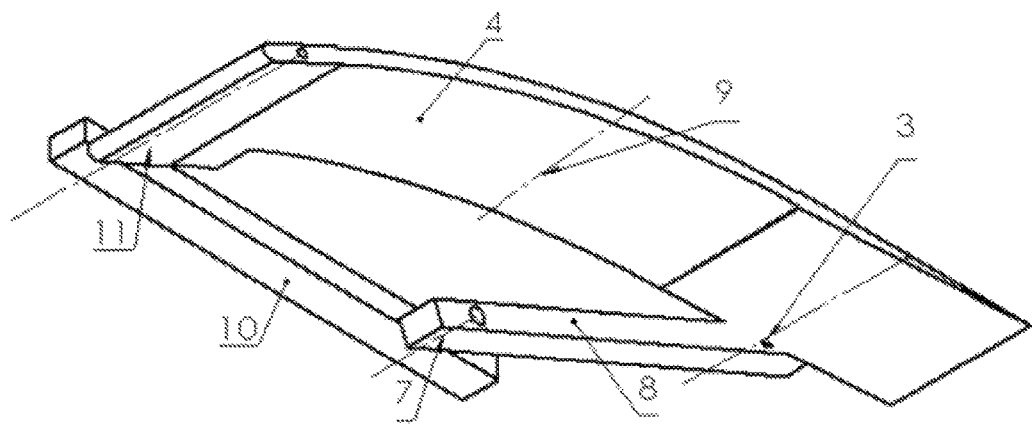
FIG. 4 shows a variant of the device in perspective with it camber generated by deformation of the profile which is made of a flexible thin material whose elasticity replaces the joint.

According to a particular embodiment, as illustrated in FIG. 4, the profile of the wing is made of an elastic flexible material whose flexibility allows modification of the camber (F) performing the function of a pivot (9), the elasticity of the material of the wing and its bending strength allowing control of the angular rotation of the pivot (11) and the joint (9) as a function of the force (Fg).

Figure 5:
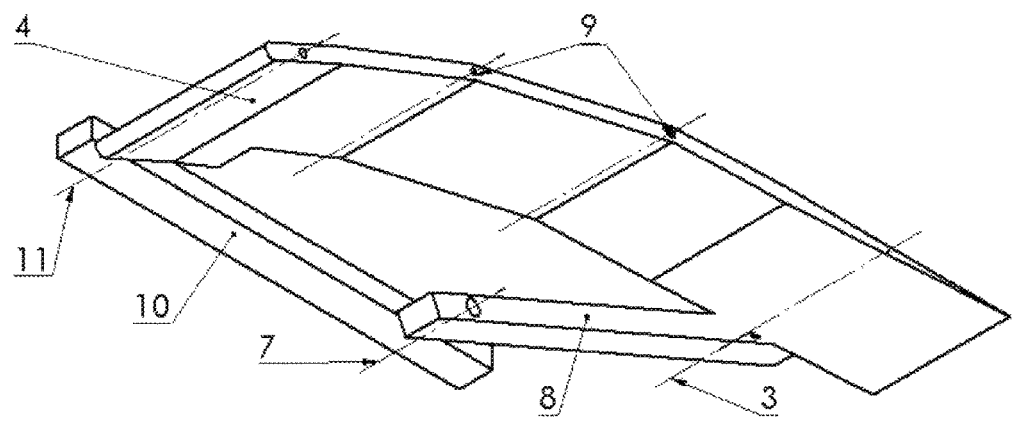
FIG. 5 shows a variant of the device in perspective with its camber generated by several joints.

According to a particular embodiment, as illustrated in FIG. 5, the joint (9) is composed of several hinges distributing the camber across several pivots.

Figure 6:
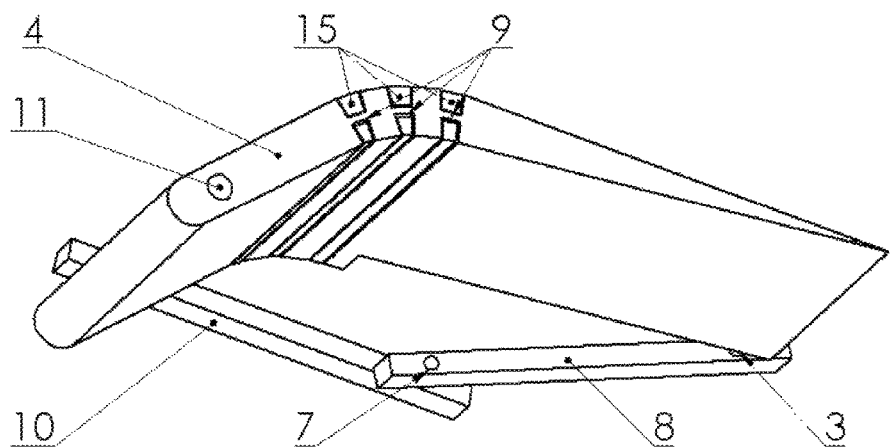
FIG. 6 shows in perspective a preferred embodiment of the device with areas of reduced thickness acting as hinges.

According to a preferred embodiment, such as shown in FIG. 6, the joint (9) is formed by grooves at right angles to the direction of the fluid, cut into the wing to form hinged areas that can be filled with a resilient material (15) to provide flexural strength varying with the elasticity of the material selected.

According to a particular embodiment the hinged areas may be reinforced with one or more strips, the material strength and elasticity of which guarantee durability and frequent extensive movements.

Figure 7:
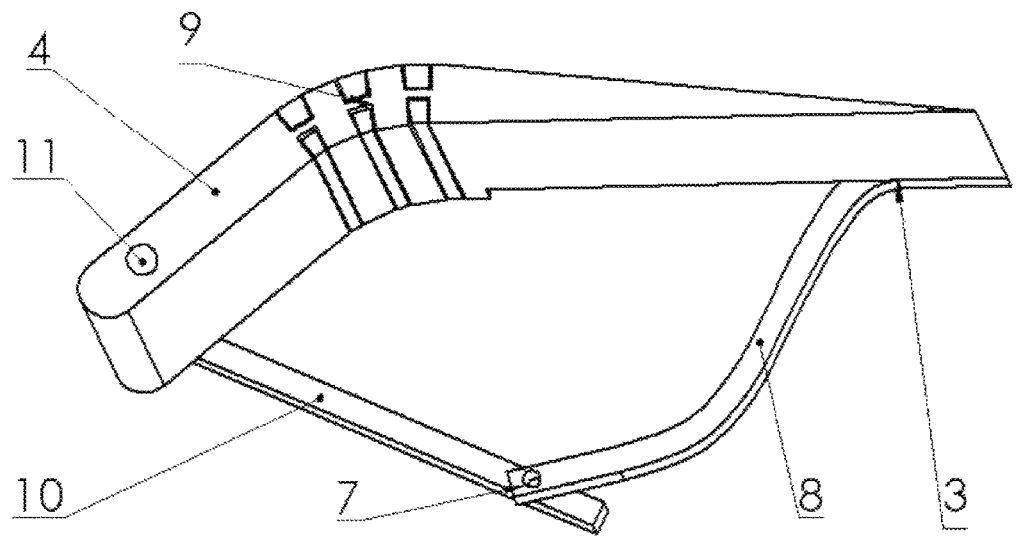
FIG. 7 shows in perspective a variant of the device.

According to a particular embodiment, as illustrated in FIG. 7, the connecting piece (8) is fused to the rear part of the profile (4) and by means of (3) deforms its elastic material.

Figure 8:
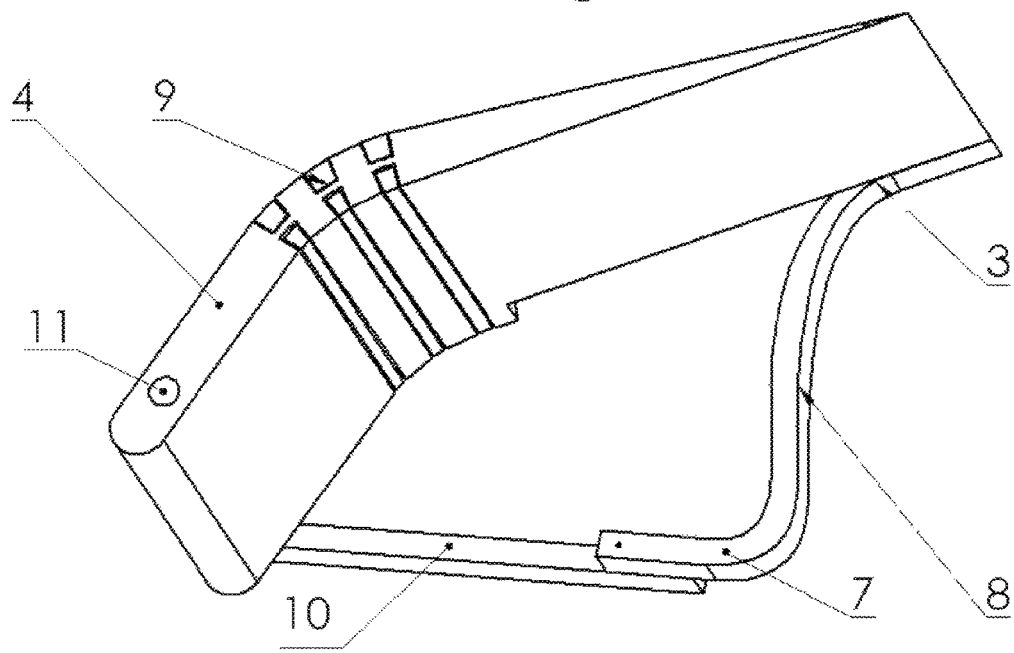
FIG. 8 shows in perspective a variant of the device.

According to a particular embodiment, as illustrated in FIG. 8, the connecting piece (8) is fused to the seat (10) and by means of (7) deforms its elastic material.

According to a preferred embodiment the connecting piece (8) is made of a rigid material, the strength and elasticity of which guarantee durability and frequent extensive movements.

According to a preferred embodiment, resistance to deformation of at least one joint of the device, implemented by a spring or the flexibility of the material of the joint, is used to determine and control the reaction of the device to the force (FG).

According to a particular embodiment, resistance to deformation of at least one joint of the device, implemented by a removable spring, is used to determine and control the reaction of the device to the force (FG).

Figure 9:
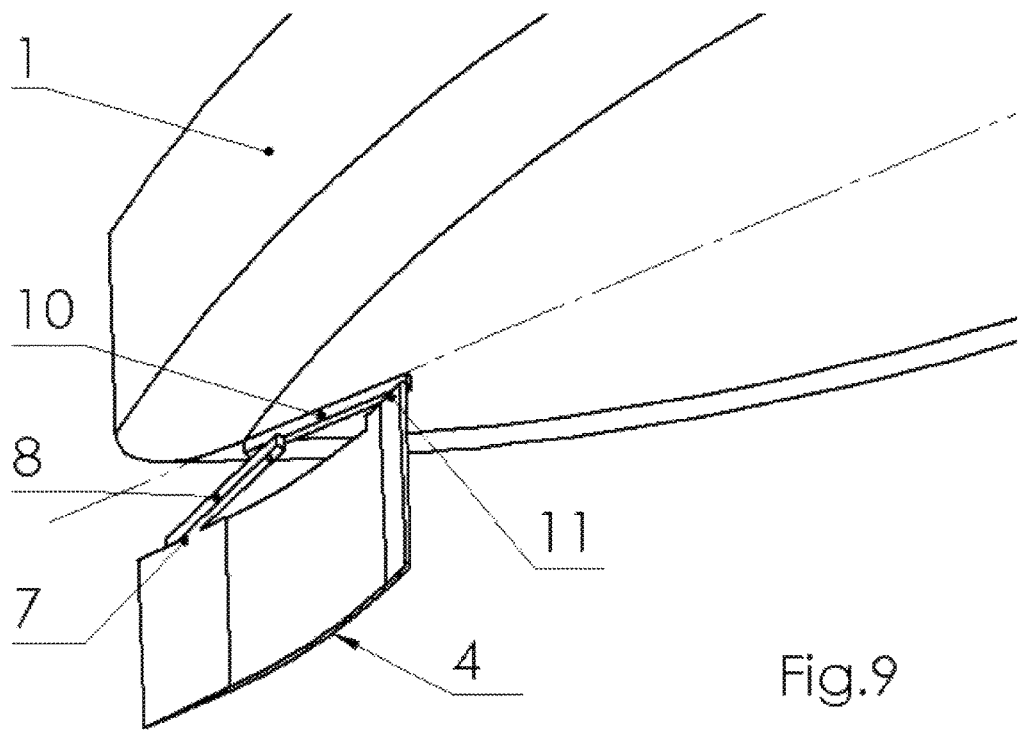
FIG. 9 shows in perspective the device being used as the centreboard of a boat.

According to a particular embodiment, as shown in FIG. 9, the seat (10) is fixed, welded or glued to the hull (1).

Figure 13:
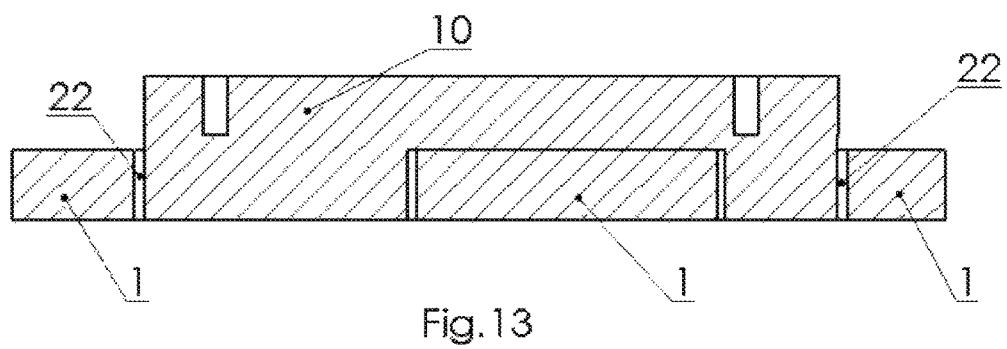
FIG. 13 shows in section an example of the means of fastening the device to the hull.

According to a particular embodiment, as shown in FIG. 13, the seat (10) is held secured to the hull (1) but is removable through a groove or recesses (22) cut into the hull.

Figure 10:
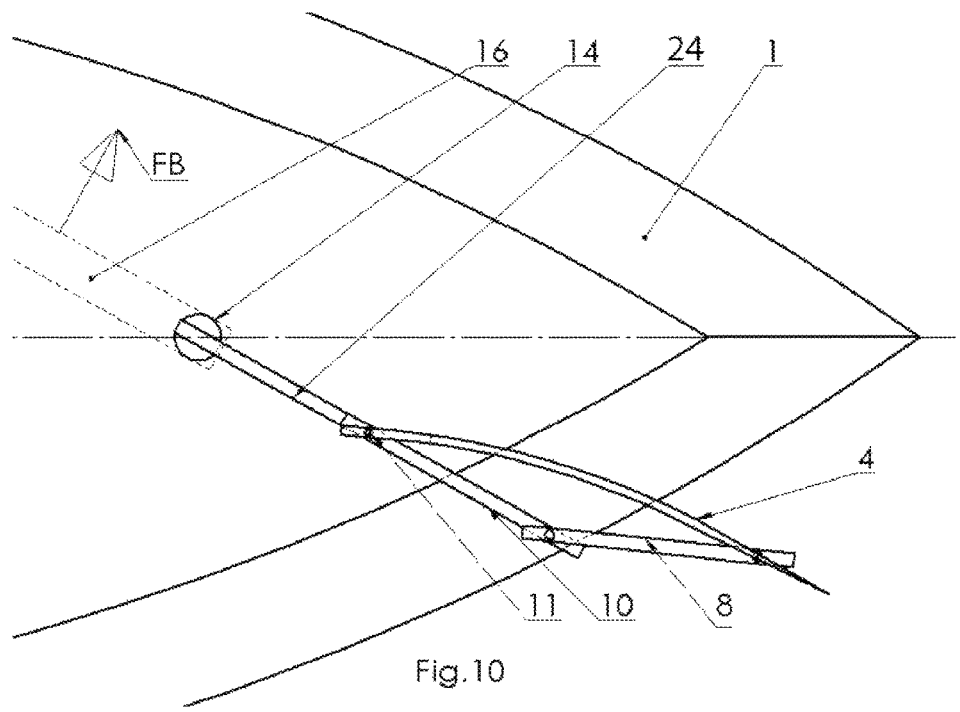
FIG. 10 shows in perspective the device fitted to a boat, constituting a control surface having a propulsive effect.

According to a particular embodiment, as illustrated in FIG. 10, the seat (10) is fixed to a movable lever (24) pivoting relative to the hull (1) about an axis (14), whose reciprocating movements (FB) generate the lateral force that alters the angle of attack and the camber of the device. The reciprocating movements (FB) on the tiller (16), generated by a motor or a person, generate a propulsive force (Pc), as illustrated in FIG. 3.

Figure 11:
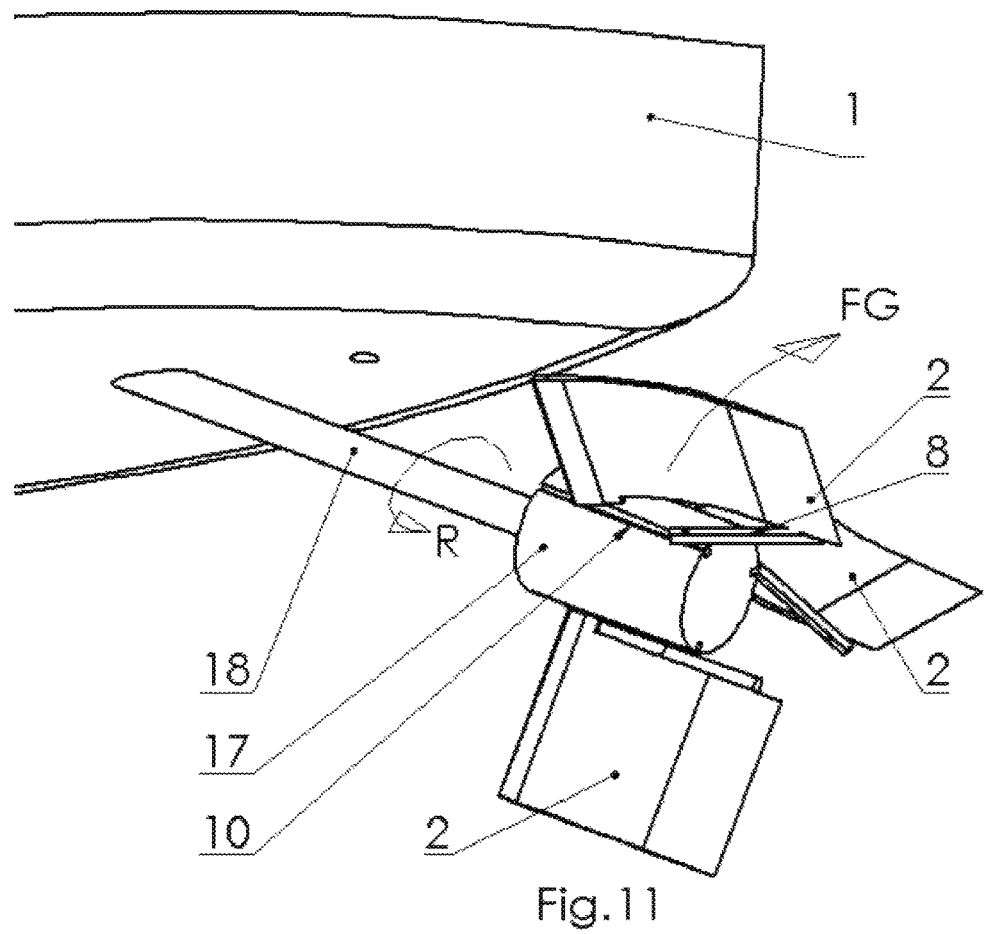
FIG. 11 shows in perspective the device constituting the blades of a pusher propeller.

According to a particular embodiment, as illustrated in FIG. 11, one or more devices according to FIG. 3, have their seats (10) attached to a rotating hub (17) with a propeller shaft (18) actuating the wings (2) of the device as propeller blades with a lateral force (FG) generated by the rotation (R) of the propeller shaft.

Referring to these drawings, a centreboard is traditionally formed of a wing (2) attached to a hull (1). This wing (2) is shaped according to a profile (4) with a leading edge (Ba) facing the stream of fluid coming from direction (D). The line connecting the leading edge (Ba) to the trailing edge (Bf) is named the chord (C). We distinguish a drag force (T) parallel to the direction (D) of the fluid with respect to the hull and a lift force (P) perpendicular to the direction of the fluid. A profile (4) has a mean camber line (L) identical with the chord (C) when the profile is symmetrical. This mean camber line (L) differs from the chord (C) when the profile is said to be cambered, and asymmetric. The camber (F) of the wing is the distance between the chord (C) and the mean camber line (L). The angle of attack (A) of the profile (4) is the angle between the direction (D) of the fluid flow and the chord (C). The device comprises a seat (10) positioned in a direction (Ax), connected to a shaped wing (2) by a pivot (11).

According to a preferred method of manufacture, though not necessarily limited to it, the wing (2) has a profile (4) having constrictions forming a series of jointed areas (9) for deforming the profile (4) in accordance with a camber (F). The constrictions forming the jointed areas (9) consist of an elastic material with flexural strength. The grooves (15) corresponding to the constrictions can be filled with elastic material allowing the joints (9) to bend. All the joints (9, 3, 7, 11) form a ring of joints linking the parts (10, 4, 8), generating a geometric deformation linking any change in the angle of attack (A) to the variation in the distance (F). The direction of the fluid (D) forms an angle of attack (A) with the chord (C), varying according to the lateral component (FG) in the direction of the fluid (D) generated by the lateral movement (DG) of the seat (10) and its support (1). The lift force (P) comprises a propulsive component (Pc) corresponding to its projection on the axis (Ax). The component of the lift force (P) projected onto the perpendicular to the axis (Ax) is the so-called anti-drift force (Cd), limiting sideslip (DG).

The device according to the invention can be mounted, as shown in FIG. 10, on a control lever (24) of a boat (1), which, being pivoted about its axis (14) by a force (BF) on the tiller (16), generates the camber and the angle of attack of the profile (4) and the propulsive forces described in FIG. 3.

FIG. 11 shows the device mounted on a hub (17) secured to a propeller shaft (18) rotating in the direction (R) for generating a force (FG) on the wings (2) of the device and producing the forces described in FIG. 3.

Figure 12:
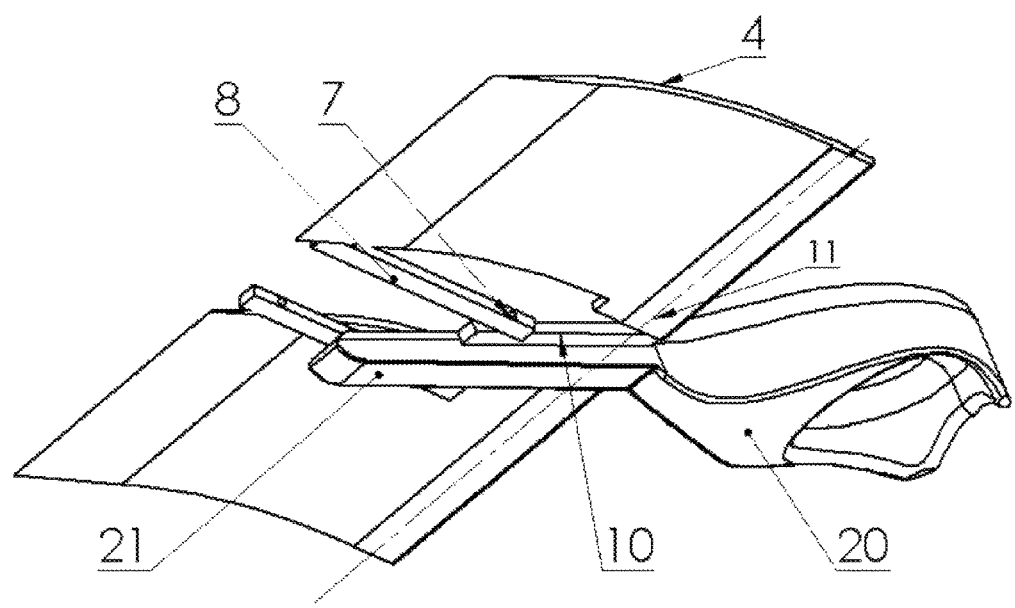
FIG. 12 shows in perspective the device constituting the active surfaces of a flipper.

FIG. 12 shows a flipper (20) with a part (21) integral with the base (10) fitted with two devices according to the invention. The transverse movement produced by the diver generates sideslip (DG) and lateral forces (FG) described in FIG. 3.

FIG. 13 shows a way of fixing the seat (10) consisting of grooves (22) cut into the hull (1) or in any medium on which it is desired to secure the seat (10).

Figure 14:
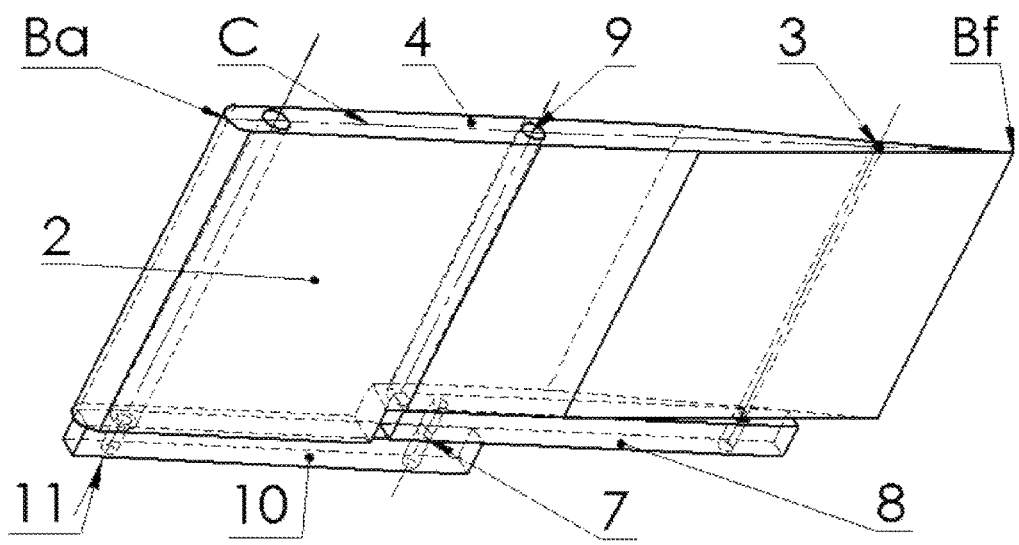
FIG. 14 is a perspective view of the device in a position with a zero angle of attack and zero camber.
Figure 15:
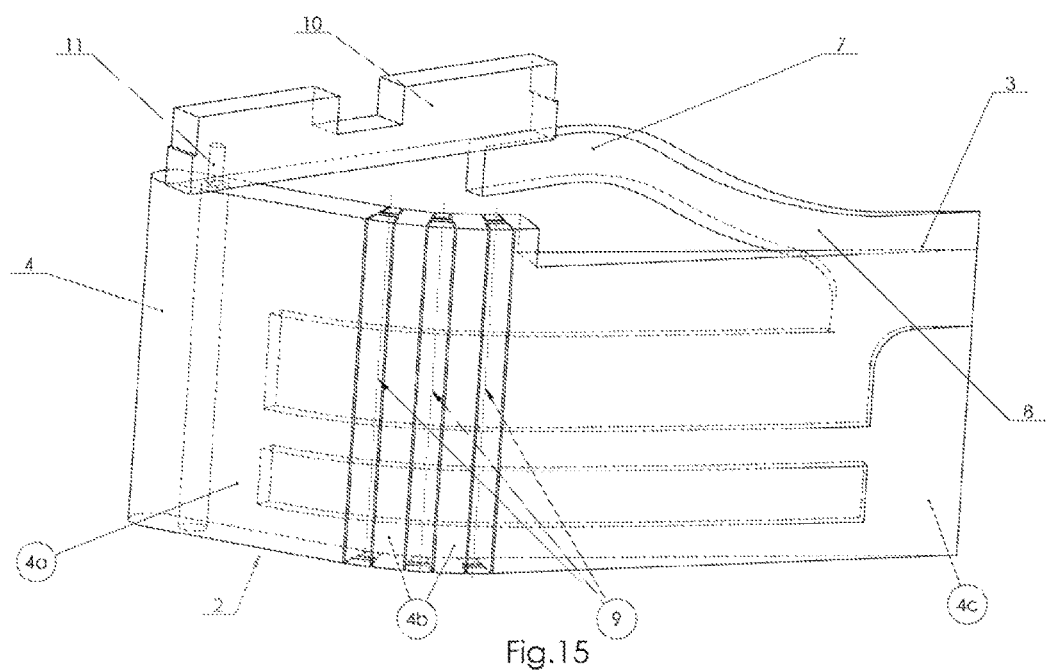
FIG. 15 shows in perspective a variant of the device.

FIG. 14 shows the device in the feathered position when no lateral force is applied to the wing (2).

What is claimed is:

1. A device for simultaneously and progressively varying the camber and angle of attack of a hydrodynamic or aerodynamic profile of a wing, in which the said wing adopts various positions including a position at rest, the profile (4) at rest being in a plane, the device comprising:
    the wing with a profile comprising a leading edge at the front and a trailing edge at the rear,
    at least one seat arranged in the upper part of the profile of the wing connected at a first end to the front upper part of the profile (4) by a first pivot and at a second end to at least one lever by at least one connection point,
    the at least one lever being connected to the rear upper part of the profile by a second pivot, wherein at rest, the at least one seat and the at least one lever are aligned or substantially aligned along a same axis and are included in a same plane as the profile.

2. The device of claim 1, wherein the profile comprises at least one joint wherein the at least one joint is pivotable.

3. The device of claim 2, wherein the at least one joint is composed of several hinges.

4. The device of claim 2, wherein the at least one joint is made of a flexible material having a first rigidity and filling a plurality of grooves cut into the wing made of a material having a second rigidity more rigid than the first rigidity.

5. The device of claim 3, wherein the at least one joint is made of a flexible material having a first rigidity and filling the plurality of grooves cut into the wing made of a material having a second rigidity more rigid than the first rigidity.

6. The device of claim 4, wherein the at least one lever forms part of the profile, in which the flexible material carries the second pivot.

7. The device of claim 5, wherein the at least one lever forms part of the profile, in which the flexible material carries the second pivot.

8. The device of claim 4, wherein the at least one lever is integral to the at least one seat, and wherein the flexible material forms also the at least one connection point.

9. The device of claim 5, wherein the at least one lever is integral to the seat, and wherein the flexible material forms also the at least one connection point.

10. The device of claim 1, wherein at least one of the first pivot, the second pivot, and the at least one connection point comprises a flexible spring portion, providing resistance to movement of the at least one of the first pivot, the second pivot, and the at least one connection point.

11. The device of claim 2, wherein at least one of the first pivot, the second pivot, and the at least one connection point comprises a flexible spring portion, providing resistance to movement of the at least one pivot.

12. The device of claim 3, wherein at least one of the first pivot, the second pivot, and the at least one connection point comprises a flexible spring portion, providing resistance to movement of the at least one of the first pivot, the second pivot, and the at least one connection point.

13. The device of claim 4, wherein at least one of the first pivot, the second pivot, and the at least one connection point comprises a flexible spring portion, providing resistance to movement of the at least one of the first pivot, the second pivot, and the at least one connection point.

14. The device of claim 5, wherein at least one of the first pivot, the second pivot, and the at least one connection point comprises a flexible spring portion, providing resistance to movement of the at least one of the first pivot, the second pivot, and the at least one connection point.

15. The device of claim 6, wherein at least one of the first pivot, the second pivot, and the at least one connection point comprises a flexible spring portion, providing resistance to movement of the at least one of the first pivot, the second pivot, and the at least one connection point.

16. The device of claim 7, wherein at least one of the first pivot, the second pivot, and the at least one connection point comprises a flexible spring portion, providing resistance to movement of the at least one of the first pivot, the second pivot, and the at least one connection point.

17. The device of claim 8, wherein at least one of the first pivot, the second pivot, and the at least one connection point comprises a flexible spring portion, providing resistance to movement of the at least one of the first pivot, the second pivot, and the at least one connection point.

18. The device of claim 2, wherein at least one of the second pivot, the at least one joint, and the at least one connection point comprises a flexible spring portion, providing resistance to movement of the at least one of the at least one joint.

19. The device of claim 1, wherein the profile of the wing comprises at least one reinforcement.

20. The device of claim 19, wherein the at least one reinforcement constitutes a hinge with at least one joint.

21. The device of claim 19, wherein the at least one lever and the at least one reinforcement is a single piece.

22. The device of claim 20, wherein the at least one lever and the at least one reinforcement is a single piece.

23. The device of claim 2, wherein the profile comprises a first part whose front portion is formed by the leading edge and a final part whose rear portion is formed by the trailing edge, and at least one intermediate part.

24. The device of claim 2, wherein the profile comprises a first part whose front portion is formed by the leading edge and a final part whose rear portion is formed by the trailing edge, and a series of intermediate parts.

25. The device of claim 3, wherein the profile comprises a first part whose front portion is formed by the leading edge and a final part whose rear portion is formed by the trailing edge, and a series of intermediate parts.

26. The device of claim 4, wherein the profile comprises a first part whose front portion is formed by the leading edge and a final part whose rear portion is formed by the trailing edge, and a series of intermediate parts.

27. The device of claim 5, wherein the profile comprises a first part whose front portion is formed by the leading edge and a final part whose rear portion is formed by the trailing edge, and a series of intermediate parts.

28. The device of claim 6, wherein the profile comprises a first part whose front portion is formed by the leading edge and a final part whose rear portion is formed by the trailing edge, and a series of intermediate parts.

29. The device of claim 7, wherein the profile comprises a first part whose front portion is formed by the leading edge and a final part whose rear portion is formed by the trailing edge, and a series of intermediate parts.

30. The device of claim 8, wherein the profile comprises a first part whose front portion is formed by the leading edge and a final part whose rear portion is formed by the trailing edge, and a series of intermediate parts.

31. The device of claim 9, wherein the profile comprises a first part whose front portion is formed by the leading edge and a final part whose rear portion is formed by the trailing edge, and a series of intermediate parts.

32. The device of claim 10, wherein the profile comprises a first part whose front portion is formed by the leading edge and a final part whose rear portion is formed by the trailing edge, and a series of intermediate parts.

33. The device of claim 11, wherein the profile comprises a first part whose front portion is formed by the leading edge and a final part whose rear portion is formed by the trailing edge, and a series of intermediate parts.

34. The device of claim 12, wherein the profile comprises a first part whose front portion is formed by the leading edge and a final part whose rear portion is formed by the trailing edge, and a series of intermediate parts.

35. The device of claim 13, wherein the profile comprises a first part whose front portion is formed by the leading edge and a final part whose rear portion is formed by the trailing edge, and a series of intermediate parts.

36. The device of claim 14, wherein the profile comprises a first part whose front portion is formed by the leading edge and a final part whose rear portion is formed by the trailing edge, and a series of intermediate parts.

37. The device of claim 15, wherein the profile comprises a first part whose front portion is formed by the leading edge and a final part whose rear portion is formed by the trailing edge, and a series of intermediate parts.

38. The device of claim 16, wherein the profile comprises a first part whose front portion is formed by the leading edge and a final part whose rear portion is formed by the trailing edge, and a series of intermediate parts.

39. The device of claim 17, wherein the profile comprises a first part whose front portion is formed by the leading edge and a final part whose rear portion is formed by the trailing edge, and a series of intermediate parts.

40. The device of claim 18, wherein the profile comprises a first part whose front portion is formed by the leading edge and a final part whose rear portion is formed by the trailing edge, and a series of intermediate parts.

41. The device of claim 20, wherein the profile comprises a first part whose front portion is formed by the leading edge and a final part whose rear portion is formed by the trailing edge, and a series of intermediate parts.

42. The device of claim 21, wherein the profile comprises a first part whose front portion is formed by the leading edge and a final part whose rear portion is formed by the trailing edge, and a series of intermediate parts.

43. The device of claim 1 further comprising a closed kinematic loop formed by the profile of the wing, the first pivot, the at least one seat the at least one connection point, the at least one lever and the second pivot.

44. A hull of a waterborne or airborne vehicle comprising one or more grooves fitted to a seat of a wing, wherein the wing and the seat are those of claim 1.

45. A propulsion or lift device pivoted with respect to a hull of a waterborne or airborne vehicle, said propulsion or lift device comprising a shaft operated by a user or an engine rotating a hub equipped with at least one wing, at least one seat, and at least one lever wherein each of the at least one wing, at least one seat, and at least one lever are those of claim 1.

* * * * *